(12) United States Patent
Buhler et al.

(10) Patent No.: US 11,199,111 B2
(45) Date of Patent: *Dec. 14, 2021

(54) ASSEMBLY FOR PARTICLE REMOVAL

(71) Applicant: General Electric Company, Schenectady, NY (US)

(72) Inventors: Jared Peter Buhler, Tewksbury, MA (US); Christopher Charles Glynn, Lawrenceburg, IN (US); Corey Bourassa, Mechanicville, NY (US); Monty Lee Shelton, Loveland, OH (US); Robert Francis Manning, Newburyport, MA (US); Victor Hugo Silva Correia, Milton Mills, NH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/901,568

(22) Filed: Jun. 15, 2020

(65) Prior Publication Data
US 2020/0308989 A1 Oct. 1, 2020

Related U.S. Application Data

(62) Division of application No. 15/210,783, filed on Jul. 14, 2016, now Pat. No. 10,704,425.

(51) Int. Cl.
*B01D 39/00* (2006.01)
*F01D 25/32* (2006.01)
(Continued)

(52) U.S. Cl.
CPC ............ *F01D 25/32* (2013.01); *B01D 45/08* (2013.01); *B01D 45/12* (2013.01); *B01D 45/16* (2013.01);
(Continued)

(58) Field of Classification Search
CPC . F01D 25/32; F01D 9/06; F01D 25/12; F01D 5/187; F01D 5/186; B01D 45/08;
(Continued)

(56) References Cited

U.S. PATENT DOCUMENTS 2,806,551 A 9/1957 Heinrich
2,887,390 A * 5/1959 Coulter ................. A23B 7/026
426/588

(Continued)

FOREIGN PATENT DOCUMENTS

EP 0162441 B1 7/1989
EP 0227577 B1 1/1992
(Continued)

OTHER PUBLICATIONS

Poplawski et al., "Microscopic Particle Separation And Applications", Aerospace Research Laboratories, 20 Years of Research Progress, Accession No. AD0667557, Project No. 7116, pp. 1-67, Feb. 1968.

(Continued)

*Primary Examiner* — Dung H Bui
(74) *Attorney, Agent, or Firm* — Venable LLP; Michele V. Frank

(57) ABSTRACT

An assembly for removing particles from a fluid stream includes a first particle remover having a main flow outlet emitting a first reduced-particle stream and a scavenge flow outlet emitting a particle-laden stream, as well as a second particle remover fluidly coupled to the scavenge flow outlet and emitting a second reduced-particle stream.

20 Claims, 10 Drawing Sheets

(51) Int. Cl.
  *B01D 46/24* (2006.01)
  *B01D 45/12* (2006.01)
  *B01D 46/42* (2006.01)
  *F01D 25/12* (2006.01)
  *F01D 9/06* (2006.01)
  *B01D 45/08* (2006.01)
  *B01D 45/16* (2006.01)
  *B01D 50/00* (2006.01)

(52) U.S. Cl.
  CPC ..... *B01D 46/2418* (2013.01); *B01D 46/4281* (2013.01); *F01D 9/06* (2013.01); *F01D 25/12* (2013.01); *B01D 50/002* (2013.01); *F05D 2220/32* (2013.01); *F05D 2260/14* (2013.01); *F05D 2260/2212* (2013.01); *F05D 2260/607* (2013.01); *Y02T 50/60* (2013.01)

(58) Field of Classification Search
  CPC .. B01D 45/16; B01D 50/002; B01D 46/2418; B01D 46/4281; B01D 45/12; F05D 2260/607; F05D 2260/14; F05D 2260/2212; F05D 2220/32; H05K 999/99; Y02T 50/676
  See application file for complete search history.

(56) References Cited

U.S. PATENT DOCUMENTS

| | | |
|---|---|---|
| 3,064,411 A | 11/1962 | Breslove, Jr. |
| 3,274,757 A | 9/1966 | Wapler |
| 3,302,396 A | 2/1967 | Robbins |
| 3,309,867 A | 3/1967 | Ehrich |
| 3,421,299 A | 1/1969 | Poplawski |
| 3,449,891 A * | 6/1969 | Amelio ............... F02B 61/04 55/306 |
| 3,993,463 A | 11/1976 | Barr |
| 4,092,130 A * | 5/1978 | Wikdahl ............... B01D 45/12 55/345 |
| 4,162,906 A * | 7/1979 | Sullivan ............... B04C 3/04 55/346 |
| 4,284,422 A * | 8/1981 | Ferland ............. B01D 46/0075 175/206 |
| 4,378,234 A | 3/1983 | Suzuki et al. |
| 4,527,387 A | 7/1985 | Lastrina et al. |
| 4,578,226 A * | 3/1986 | Adlhoch ............... B01D 47/10 261/71 |
| 4,650,578 A | 3/1987 | Cerdan et al. |
| 4,685,942 A | 8/1987 | Klassen et al. |
| 4,820,122 A | 4/1989 | Hall et al. |
| 4,820,123 A | 4/1989 | Hall |
| 4,992,025 A | 2/1991 | Stroud et al. |
| 5,062,768 A | 11/1991 | Marriage |
| 5,135,354 A | 8/1992 | Novotny |
| 5,193,975 A | 3/1993 | Bird et al. |
| 5,279,109 A | 1/1994 | Liu et al. |
| 5,348,571 A | 9/1994 | Weber |
| 5,498,273 A | 3/1996 | Mann |
| 5,538,394 A | 7/1996 | Inomata et al. |
| 5,558,496 A | 9/1996 | Woodmansee et al. |
| 5,700,131 A | 12/1997 | Hall et al. |
| 5,788,741 A | 8/1998 | Burton et al. |
| 5,827,043 A | 10/1998 | Fukuda et al. |
| 5,857,833 A | 1/1999 | Dev |
| 5,918,458 A | 7/1999 | Coffinberry et al. |
| 5,951,250 A | 9/1999 | Suenaga et al. |
| 6,033,181 A | 3/2000 | Endres et al. |
| 6,039,537 A | 3/2000 | Scheurlen |
| 6,051,256 A * | 4/2000 | Platz ............... A61K 9/145 424/489 |
| 6,151,881 A | 11/2000 | Ai et al. |
| 6,164,913 A | 12/2000 | Reddy |
| 6,238,183 B1 | 5/2001 | Williamson et al. |
| 6,238,459 B1 | 5/2001 | Downs |
| 6,261,053 B1 | 7/2001 | Anderson et al. |
| 6,264,428 B1 | 7/2001 | Dailey et al. |
| 6,277,278 B1 | 8/2001 | Conrad et al. |
| 6,318,960 B1 | 11/2001 | Kuwabara et al. |
| 6,318,963 B1 | 11/2001 | Emery et al. |
| 6,368,060 B1 | 4/2002 | Fehrenbach et al. |
| 6,382,906 B1 | 5/2002 | Brassfield et al. |
| 6,413,044 B1 | 7/2002 | Roeloffs et al. |
| 6,527,829 B1 | 3/2003 | Malkamaki et al. |
| 6,673,133 B2 | 1/2004 | Sechrist et al. |
| 6,698,180 B2 | 3/2004 | Snyder |
| 6,698,297 B2 | 3/2004 | Gysling |
| 6,840,737 B2 | 1/2005 | Flatman |
| 6,875,256 B2 | 4/2005 | Gillingham et al. |
| 6,910,370 B2 | 6/2005 | Clark et al. |
| 6,969,237 B2 | 11/2005 | Hudson |
| 7,048,501 B2 | 5/2006 | Katayama et al. |
| 7,052,532 B1 | 5/2006 | Liu et al. |
| 7,080,972 B2 | 7/2006 | Rawlinson |
| 7,097,419 B2 | 8/2006 | Lee et al. |
| 7,128,533 B2 | 10/2006 | Liang |
| 7,137,777 B2 | 11/2006 | Fried et al. |
| 7,244,101 B2 | 7/2007 | Lee et al. |
| 7,284,953 B2 | 10/2007 | Silverman et al. |
| 7,390,339 B1 * | 6/2008 | Warrick ................ B01D 45/12 55/346 |
| 7,431,559 B2 | 10/2008 | Paauwe et al. |
| 7,540,712 B1 | 6/2009 | Liang |
| 7,563,073 B1 | 7/2009 | Liang |
| 7,572,102 B1 | 8/2009 | Liang |
| 7,581,397 B2 | 9/2009 | Strangman et al. |
| 7,582,129 B2 * | 9/2009 | Kim ..................... A47L 9/1625 15/353 |
| 7,582,145 B2 | 9/2009 | Krigmont |
| 7,645,122 B1 | 1/2010 | Liang |
| 7,665,965 B1 | 2/2010 | Liang |
| 7,770,375 B2 | 8/2010 | Alvanos et al. |
| 7,874,158 B2 | 1/2011 | Lisa O |
| 7,879,123 B2 | 2/2011 | Lundquist et al. |
| 7,921,654 B1 | 4/2011 | Liang |
| 7,922,784 B2 | 4/2011 | Saeed et al. |
| 7,934,906 B2 | 5/2011 | Gu et al. |
| 7,955,053 B1 | 6/2011 | Liang |
| 7,967,554 B2 | 6/2011 | Bremer |
| 7,976,277 B2 | 7/2011 | Kopmels et al. |
| 8,092,145 B2 | 1/2012 | Martel et al. |
| 8,104,362 B2 | 1/2012 | McFarland et al. |
| 8,142,153 B1 | 3/2012 | Liang |
| 8,176,720 B2 | 5/2012 | Beeck |
| 8,240,121 B2 | 8/2012 | Hazzard et al. |
| 8,328,614 B2 | 12/2012 | Jones et al. |
| 8,561,411 B2 | 10/2013 | DiBenedetto |
| 8,573,034 B2 | 11/2013 | Grant et al. |
| 8,626,467 B2 | 1/2014 | Fang |
| 8,672,629 B2 | 3/2014 | Botrel et al. |
| 8,733,185 B2 | 5/2014 | Solomon |
| 8,746,464 B2 | 6/2014 | Maier |
| 9,915,176 B2 | 3/2018 | Murray et al. |
| 10,036,319 B2 | 7/2018 | Murray et al. |
| 10,167,725 B2 | 1/2019 | Manning et al. |
| 10,286,407 B2 | 5/2019 | Correia et al. |
| 2002/0166200 A1 | 11/2002 | Conrad et al. |
| 2002/0182062 A1 | 12/2002 | Scimone |
| 2003/0115843 A1 | 6/2003 | Haland |
| 2004/0197191 A1 | 10/2004 | Cunha et al. |
| 2004/0221717 A1 | 11/2004 | Armstrong et al. |
| 2004/0221720 A1 | 11/2004 | Anderson et al. |
| 2004/0261374 A1 | 12/2004 | Bailey et al. |
| 2005/0118024 A1 | 6/2005 | Anguisola McFeat et al. |
| 2005/0129508 A1 | 6/2005 | Fried et al. |
| 2005/0138762 A1 * | 6/2005 | West ..................... A47L 9/122 15/353 |
| 2005/0160716 A1 | 7/2005 | Jansen |
| 2005/0214118 A1 | 9/2005 | Dodd |
| 2005/0252837 A1 | 11/2005 | Haland |
| 2006/0073015 A1 | 4/2006 | Liang |
| 2006/0275118 A1 | 12/2006 | Lee |
| 2007/0048122 A1 | 3/2007 | Van Suetendael et al. |
| 2007/0140848 A1 | 6/2007 | Charbonneau et al. |

(56) References Cited

U.S. PATENT DOCUMENTS

| | | |
|---|---|---|
| 2007/0142198 A1* | 6/2007 | Mueller .............. B64D 13/00 494/14 |
| 2008/0041064 A1 | 2/2008 | Moore et al. |
| 2009/0060715 A1 | 3/2009 | Kopmels |
| 2009/0081024 A1 | 3/2009 | Tibbott |
| 2009/0155088 A1 | 6/2009 | Lee et al. |
| 2009/0202337 A1 | 8/2009 | Bosley et al. |
| 2009/0215329 A1 | 8/2009 | Suzuki et al. |
| 2009/0255230 A1 | 10/2009 | Mildner |
| 2009/0261208 A1 | 10/2009 | Belyew |
| 2010/0021308 A1 | 1/2010 | Rawlinson |
| 2010/0024370 A1 | 2/2010 | Jones et al. |
| 2010/0040480 A1 | 2/2010 | Webster et al. |
| 2010/0119377 A1 | 5/2010 | Tibbott et al. |
| 2010/0162682 A1 | 7/2010 | Lerg |
| 2010/0172762 A1 | 7/2010 | Rawlinson |
| 2010/0239409 A1 | 9/2010 | Draper |
| 2010/0247321 A1 | 9/2010 | Kulkarni et al. |
| 2010/0254801 A1 | 10/2010 | Tibbott |
| 2011/0016838 A1 | 1/2011 | Smithies et al. |
| 2011/0067378 A1 | 3/2011 | Tibbott et al. |
| 2011/0236188 A1 | 9/2011 | Knapp et al. |
| 2011/0247345 A1 | 10/2011 | Laurello et al. |
| 2011/0247347 A1 | 10/2011 | Ebert et al. |
| 2011/0296869 A1 | 12/2011 | Buhrman et al. |
| 2012/0000168 A1 | 1/2012 | Chaudhari et al. |
| 2012/0070308 A1 | 3/2012 | Naik et al. |
| 2012/0103188 A1* | 5/2012 | Stinessen .............. F04D 29/705 95/24 |
| 2012/0103423 A1 | 5/2012 | Schook |
| 2012/0168092 A1* | 7/2012 | Keckler, III .......... B01D 45/16 159/16.1 |
| 2012/0192714 A1 | 8/2012 | Kulprathipanja et al. |
| 2012/0207594 A1 | 8/2012 | Chanez et al. |
| 2012/0233973 A1 | 9/2012 | Sedillo |
| 2012/0297742 A1 | 11/2012 | Betting et al. |
| 2013/0213235 A1 | 8/2013 | da Silva et al. |
| 2013/0223987 A1 | 8/2013 | Stafford et al. |
| 2013/0336861 A1* | 12/2013 | Bollaert .................. C10J 3/726 423/210 |
| 2013/0340618 A1 | 12/2013 | Kwok et al. |
| 2014/0083116 A1 | 3/2014 | Crites et al. |
| 2014/0116255 A1 | 5/2014 | Pérez Guerra et al. |
| 2014/0196437 A1 | 7/2014 | Schneider |
| 2014/0250625 A1 | 9/2014 | Huang |
| 2014/0290254 A1 | 10/2014 | Manning et al. |
| 2015/0101686 A1 | 4/2015 | Sasao |
| 2015/0135961 A1 | 5/2015 | Sugio et al. |
| 2015/0204222 A1 | 7/2015 | Bailey et al. |
| 2016/0115835 A1 | 4/2016 | Daido et al. |
| 2016/0115916 A1 | 4/2016 | Kinsey, Jr. et al. |
| 2016/0237523 A1* | 8/2016 | Guntner ................ B01D 53/64 |
| 2016/0316769 A1 | 11/2016 | Herrera |
| 2017/0065932 A1* | 3/2017 | Al-Kuait .................. G01F 1/74 |
| 2018/0010520 A1 | 1/2018 | Iwasaki et al. |

FOREIGN PATENT DOCUMENTS

| | | |
|---|---|---|
| EP | 0340149 B1 | 5/1993 |
| EP | 0924408 A2 | 6/1999 |
| EP | 0690202 B1 | 8/2001 |
| EP | 1267037 B1 | 7/2006 |
| EP | 2549078 A1 | 1/2013 |
| EP | 2405985 B1 | 8/2013 |
| EP | 2927428 A1 | 10/2015 |
| GB | 711304 A | 6/1954 |
| GB | 1070458 A | 6/1967 |
| GB | 1146262 A | 3/1969 |
| GB | 1412780 A | 11/1975 |
| GB | 2270481 A1 | 3/1994 |
| WO | 2011006262 A1 | 1/2011 |
| WO | 2011115880 A1 | 9/2011 |

OTHER PUBLICATIONS

Walsh et al., "Effects of Sand Ingestion on the Blockage of Film-Cooling Holes", Proceedings of GT2006, ASME Turbo Expo 2006: Power for Land, Sea and Air, Barcelona, Spain, vol. No. 3, pp. 81-90, May 8-11, 2006.

Sennett, "Air Filtration: Perfect Air Filtering for Gas Turbines." Filtration & Separation, vol. 44, Issue. 10, pp. 20-22, Dec. 2007.

Musgrove et al., "Computational Design of a Louver Particle Separator for Gas Turbine Engines", Proceedings of ASME Turbo Expo 2009: Power for Land, Sea and Air, GT2009, Orlando, Florida, USA, vol. No. 3, pp. 1313-1323, Jun. 8-12, 2009.

Cardwell et al., "Investigation of Sand Blocking Within Impingement and Film-Cooling Holes", Journal of Turbomachinery, Transactions of the ASME, vol. No. 132, Issue No. 2, pp. 021020-1-021020-10, Apr. 2010.

Filippone et al., "Turboshaft Engine Air Particle Separation", Progress in Aerospace Sciences, vol. No. 46, Issue No. 5-6, pp. 224-245, Jul.-Aug. 2010.

Lawson et al., "Simulations of Multiphase Particle Deposition on Endwall Film-Cooling Holes in Transverse Trenches", Journal of Turbomachinery, Transactions of the ASME, vol. No. 134, pp. 051040-1-051040-10, Sep. 2012.

Lawson et al., "Simulations of Multiphase Particle Deposition on a Showerhead With Staggered Film-Cooling Holes", Journal of Turbomachinery, Transactions of the ASME, vol. No 134, pp. 051041-1-051041-12, Sep. 2012.

* cited by examiner

ASSEMBLY FOR PARTICLE REMOVAL

CROSS-REFERENCE TO RELATED APPLICATION

This application claims the benefit of and is a divisional of U.S. application Ser. No. 15/210,783, filed Jul. 14, 2016, presently allowed, which is incorporated herein by reference in its entirety.

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, may be necessary. Typically, cooling is accomplished by ducting cooler air from the high and/or low pressure compressors to the engine components which require cooling. Temperatures in the high pressure turbine are around 1000° C. to 2000° C. and the cooling air from the compressor is around 500° C. to 700° C. While the compressor air is a high temperature, it is cooler relative to the turbine air, and may be used to cool the turbine.

Particles, such as dirt, dust, sand, and other environmental contaminants, in the cooling air can cause a loss of cooling and reduced operational time or "time-on-wing" for the aircraft environment. For example, particles supplied to the turbine blades can clog, obstruct, or coat the flow passages and surfaces of the blades, which can reduce the lifespan of the turbine. This problem is exacerbated in certain operating environments around the globe where turbine engines are exposed to significant amounts of airborne particles.

In geographic regions of the world that are in proximity to desert environments, this airborne particulate is often fine grain sand. Fine sand particulate is easily ingested into the engine core through the gas turbine inlet, and is subsequently carried into the cooling system. Once in the cooling system, fine sand particulate has a propensity to deposit on high temperature surfaces, such as those found in the turbine guide vanes aft of the combustor, and will accumulate over time to block the flow of cooling air or foul small holes, such as the film cooling holes, which leads to a loss of cooling effectiveness that increases component metal temperatures and thus can negatively impact the durability of the engine component. Fine sand accumulation is particularly prevalent when impingement cooling systems are employed through the use of an impingement baffle, or insert, in which the cooling air is directed to impinge in small jets on the internal surface of the turbine guide vanes surface adjacent to the hot gas path air to increase the cooling effectiveness.

BRIEF DESCRIPTION OF THE INVENTION

In one aspect, the disclosure relates to an assembly for removing particles from a fluid stream, including a first particle remover having a particle separator separating the fluid stream into a first reduced-particle stream and a particle-laden stream, and comprising a main flow outlet emitting the first reduced-particle stream and a scavenge flow outlet emitting the particle-laden stream, a second particle remover fluidly coupled to the scavenge flow outlet and comprising a return outlet emitting a second reduced-particle stream, and a venturi having a low pressure inlet fluidly coupled to the return outlet.

In another aspect, the disclosure relates to an assembly for removing particles from a fluid stream, including a first particle remover having a particle separator separating the fluid stream into a first reduced-particle stream and a particle-laden stream, and comprising a main flow outlet emitting the first reduced-particle stream and a scavenge flow outlet emitting the particle-laden stream, a second particle remover fluidly coupled to the scavenge flow outlet and comprising a return outlet emitting a second reduced-particle stream, and a venturi formed by a junction of the main flow outlet and the return outlet, where the main flow outlet at the junction has a reduced cross section defining a low pressure area, and the return outlet is fluidly coupled to the low pressure area at the junction, whereby the second reduced-particle stream is drawn by the low pressure area into and mixed with the first reduced-particle stream at the junction.

In yet another aspect, the disclosure relates to an assembly for removing particles from a fluid stream, including a first particle remover having a main flow outlet emitting a first reduced-particle stream and a scavenge flow outlet emitting a particle-laden stream, a second particle remover fluidly coupled to the scavenge flow outlet and comprising a return outlet emitting a second reduced-particle stream, and a venturi fluidly coupling the first particle remover and the second particle remover.

DESCRIPTION OF EMBODIMENTS OF THE INVENTION

Figure 1:
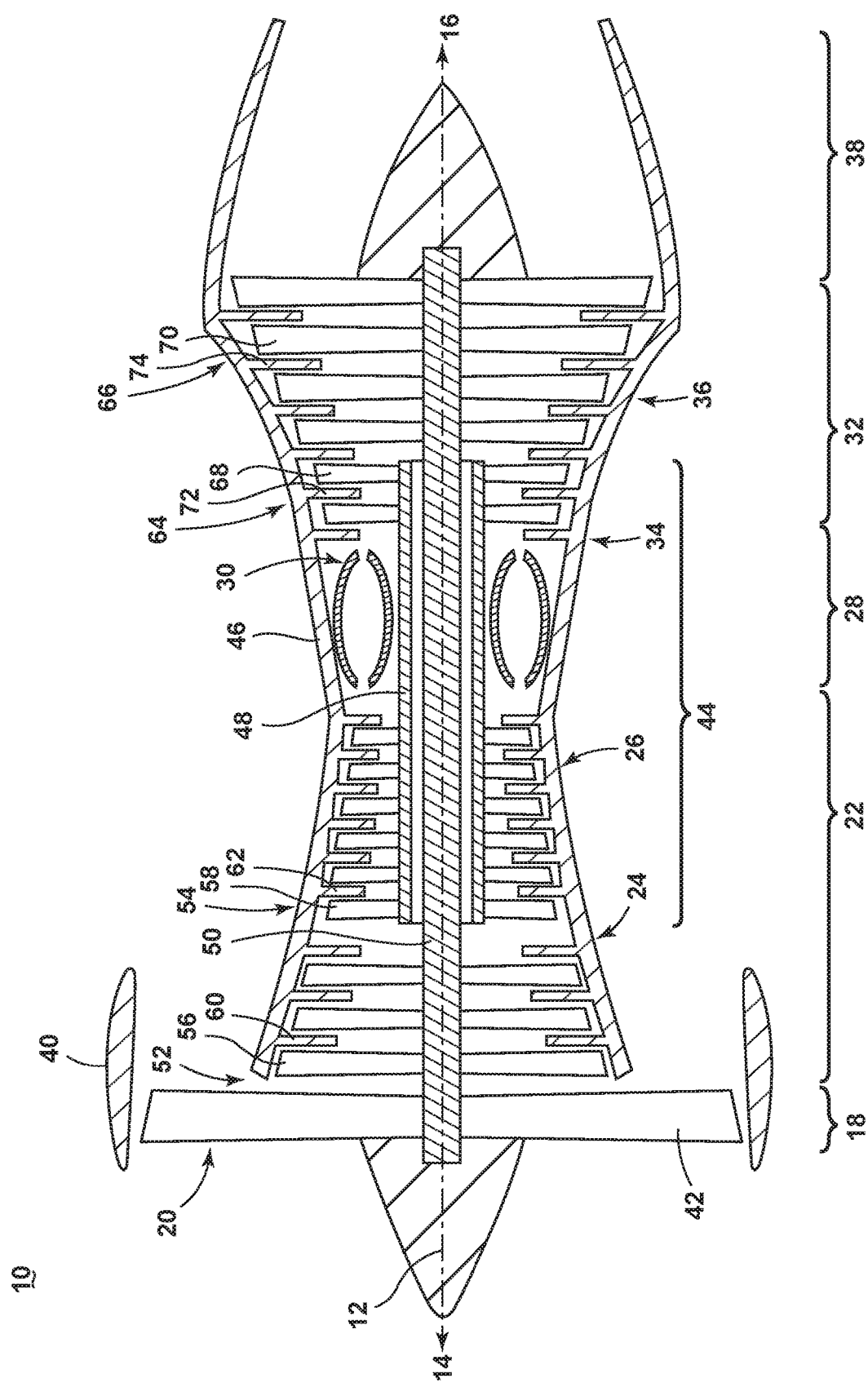
FIG. 1 is a schematic cross-sectional diagram of a gas turbine engine for an aircraft.

The described embodiments of the present invention are directed to systems, methods, and other devices related to particle removal, particularly in a turbine engine, and more particularly to the removal of particles from a cooling air flow in a turbine engine. For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine centerline.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 may bypass the engine core 44 and be used for cooling of portions, especially hot portions, of the engine 10, and/or used to cool or power other aspects of the aircraft. This air is often referred to as bypass air, which is one form of a cooling fluid when used to cool. In the context of a turbine engine, the hot portions of the engine are normally downstream of the combustor 30, especially the turbine section 32, with the HP turbine 34 being the hottest portion as it is directly downstream of the combustion section 28. Other portions of the aircraft, not part of the engine, may be considered a hot portion that is to be cooled.

Figure 2:
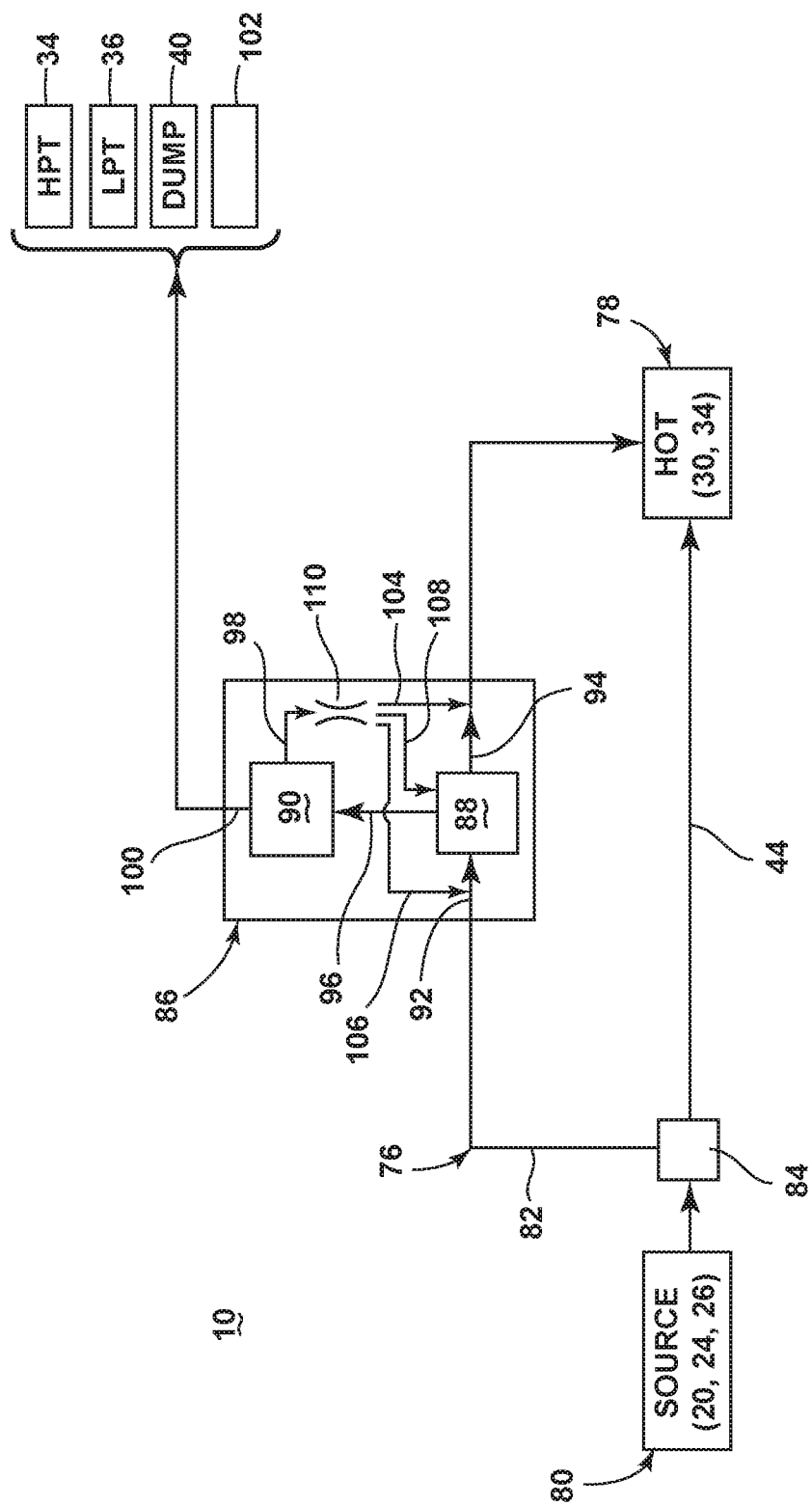
FIG. 2 is a schematic view showing a bypass cooling circuit for the engine of FIG. 1 having an assembly according to a first embodiment of the invention.

FIG. 2 is a schematic view showing a portion of the engine 10 from FIG. 1. The engine 10 can further include a cooling circuit 76 for providing cooling fluid to at least one hot portion 78 of the engine 10 during operation. In order to cool the hot portion 78 of the engine, the cooling fluid is at a temperature that is less than the operational temperature of the hot portion 78; i.e. the temperature of the hot portion 78 during normal operation of the engine 10. As indicated in FIG. 2, the hot portion 78 of the engine 10 may include, but is not limited to, the HP turbine 34 and the walls of the combustor 30. A source of cooling fluid 80 entering the cooling circuit 76 may be, but is not limited to, fluid discharged from the fan 20, the LP compressor 24, or the HP compressor 26.

The cooling circuit 76 includes a conduit 82 which bypasses at least a portion of the core 44 of the engine 10 in order to provide cooling fluid to the hot portion 78 of the engine 10. Air may enter the conduit 82 from the source of cooling fluid 80, and may exit the conduit 82 at the hot portion 78 of the engine 10 to which the cooling fluid is to be supplied.

In one configuration, the cooling circuit 76 can include a flow divider 84 which separates the fluid stream from the source of cooling fluid 80 into a core fluid stream which enters the core 44 and a bypass fluid stream which enters the conduit 82. In one configuration, the flow divider 84 can be located between fan blades 42 and the LP compressor 24 (FIG. 1), with the core fluid stream entering the LP compressor 24 and the surrounding bypass fluid stream entering the conduit 82. However, the location of the flow divider 84 can vary depending on the source of cooling fluid 80.

The cooling circuit 76 may include an assembly 86 for removing entrained particles from the cooling fluid stream. The assembly includes a first particle remover having a first particle separator 88 for separating particles, which may include, but is not limited to, dirt, dust, debris, and other contaminants, from the cooling fluid stream from the source prior to being supplied to the hot portion of the engine 10, and a second particle remover 90 for further separating and/or collecting at least some of the particles from the particle-laden stream. The separator assembly 86 may define a portion of the conduit 82, and may be located anywhere along the conduit 82.

The first particle separator 88 may, for example, be an inertial separator which separates particles from the cooling air flow using a combination of forces, such as centrifugal, gravitational, and inertial. More specifically, the inertial separator may be a centrifugal or cyclonic separator, which uses cyclonic action to separate particles from the cooling air flow. Some examples of particle separators are disclosed in U.S. Provisional Application No. 62/004,736, filed May 29, 2013, which is incorporated herein by reference in its entirety.

The particle separator 88 includes a flow inlet 92, a main flow outlet 94, and a scavenge flow outlet 96. The cooling fluid stream entering the particle separator 88 at the flow inlet 92 is separated into a particle-laden stream which contains at least some of the particles from the cooling fluid stream, and a reduced-particle stream which contains fewer or a lower concentration of particles than the particle-laden stream. For example, the particle-laden stream can contain 50%-99% of the particles that were present in the cooling fluid stream entering the particle separator 88. The reduced-particle stream exits the particle separator 88 via the main flow outlet 94, and is provided to the hot portion 78 of the engine 10 for cooling.

The scavenge flow outlet 96 is coupled with the second particle remover 90 to further separate and/or collect at least some of the particles from the particle-laden stream that exits the particle separator 88. The particle remover 90 includes a return outlet 98 that emits a second reduced-particle stream. Examples of the second particle remover 90 include a filter, in which the particle-laden stream flows through a filter media and the filter media retains at least some of the particles, a particle entrapment device having a substrate upon which the particle-laden stream impinges, or a second particle separator such as an inertial separator which separates particles from the particle-laden stream using a combination of forces, such as centrifugal, gravitational, and inertial. In the case of a second particle separator, the particle remover 90 may further include a second scavenge outlet 100 emitting a second particle-laden stream. The second particle-laden stream may be exhausted from the engine 10 or may be utilized in another portion of the engine 10. For example, the second particle-laden stream may be used for cooling the HP turbine after passing through an additional particle remover, driving the LP turbine 36, dumped from the engine 10 under the fan casing 40, or supplied to a combustor bleed 102 after passing through an additional particle remover.

In one example, 80-95% of the cooling fluid stream entering the particle separator 88 at the flow inlet 92 can be exhausted through the main flow outlet 94 to the hot portion 78 of the engine 10 for cooling, while 5-20% of the incoming cooling fluid stream may be provided to the second particle remover 90. For a second particle remover 90 comprising a filter, the entire 5-20% of the cooling fluid stream may be returned to the main flow passing to the hot portion 78 of the engine. For a second particle remover 90 comprising a second particle separator, 1-2% of the cooling fluid stream may be exhausted through the second scavenge outlet 100.

The second reduced-particle stream emitted from the return outlet 98 can be rejoined with the main cooling fluid flow provided to the hot portion 78 at various locations within the cooling circuit 76. In one example, the return outlet 98 can be coupled downstream of the main flow outlet 94 to join the second reduced-particle stream with the reduced-particle stream exiting the particle separator 88 via a return conduit 104. In another example, the return outlet 98 can be coupled upstream of the flow inlet 92 to join the second reduced-particle stream with the cooling fluid stream entering the particle separator 88 via a return conduit 106. In yet another example, the return outlet 98 can be coupled between the flow inlet 92 and main flow outlet 94 to join the second reduced-particle stream with the cooling fluid stream passing through the particle separator 88 via a return conduit 108.

The second reduced-particle stream experiences a pressure drop across the second particle remover 90. In order to reintroduce the second reduced-particle stream from the particle remover 90 into the first reduced-particle stream from the particle separator 88, the second reduced-particle stream must be introduced into a location of low static pressure. One way to create a low static pressure is by utilizing a venturi 110, and injecting the second reduced-particle stream into the venturi 110. The venturi 110 can be designed to minimize the loss of total pressure.

In the illustrated embodiment, the venturi 110 is fluidly coupled with the return outlet 98. The venturi 110 can be a constricted section of one of the return conduits 104, 106, 108, which may further be formed as a portion of the first particle separator 88 or second particle remover 90. In other embodiments, the venturi 110 can be a bypass that couples a higher pressure stream to a lower pressure stream.

It is noted that the various inlets and outlets discussed for FIG. 2 may comprise a single entrance or exit for fluid, or may alternatively be defined by a collective group of entrances or exits. Furthermore, it is noted that while the assembly 86 is illustrated as having two stages of particle removal (the particle separator 88 and the particle remover 90), the assembly 86 could include additional stages of particle removal, including multiple particle removers arranged in parallel, such that the fluid stream is divided to pass through one of the multiple particle removers, or may be arranged in series, such that the fluid stream sequentially passes through multiple particle removers for the removal of increasingly smaller or finer particles at each stage.

FIGS. 3-10 show various embodiments of assemblies which may be incorporated into the engine 10 shown in FIG. 1 or the cooling circuit 76 shown in FIG. 2. It is understood that the engine 10 or cooling circuit 76 may incorporate more than one of the following assemblies. Furthermore, the engine 10 or bypass cooling circuit 76 may incorporate a combination of the following assemblies.

Figure 3:
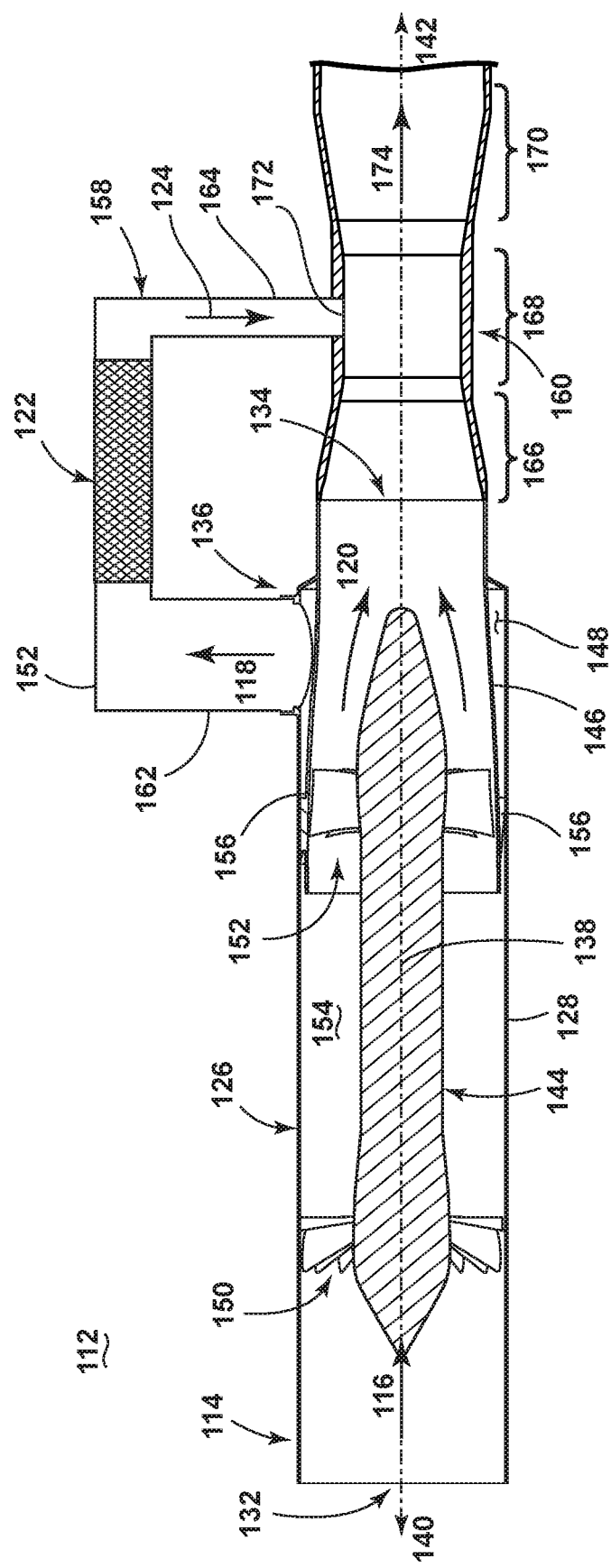
FIG. 3 is a schematic sectional view of an assembly according to a second embodiment of the invention.

FIG. 3 is a schematic sectional view of an assembly according to a second embodiment of the invention. The assembly 112 includes a first particle remover in the form of an inertial separator 114 for separating particles from an incoming cooling fluid stream 116 into a particle-laden stream 118 which contains at least some of the particles from the cooling fluid stream, and a reduced-particle stream 120 which contains fewer or a lower concentration of particles than the particle-laden stream 118, and a second particle remover in the form of a filter 122 for further collecting at least some of the particles from the particle-laden stream 118. A second reduced-particle stream 124 is emitted from the filter 122 and returned to the inertial separator 114.

The inertial separator 114 includes a body 126 having a peripheral wall 128 defining a flow passage, with a flow inlet 132 which receives the cooling fluid stream 116, a main flow outlet 134 through which the reduced-particle stream 120 is passed, and a scavenge outlet 136 through which the particle-laden stream 118 is passed.

The body 126 defines a centerline 138 of the inertial separator 114, with the centerline 138 generally defining an upstream direction 140 and downstream direction 142 with respect to the inertial separator 114. The inertial separator 114 shown in FIG. 3 is an axial-flow centrifugal separator, with the flow inlet 132 and main flow outlet 134 co-axially aligned and lying along the centerline 138. In other configurations, the centerline 138 can follow a curve or bend such that the flow inlet 132 and main flow outlet 134 are not co-axially aligned.

In this embodiment, the peripheral wall 128 is provided as an outer, annular wall. A centerbody 144 can be spaced from the peripheral wall 128, and can extend co-axially along the centerline 138. The centerbody 144 may be straight, as shown, curved, or bent. The centerbody 144 can be designed to provide an aerodynamic profile for the flowing air to pass smoothly around the centerbody 144 without separating from the surface of the centerbody 144.

A scavenge annulus 146 is spaced radially inwardly from the peripheral wall 128, which defines, at least in part, the scavenge outlet 136. The scavenge outlet 136 can be formed as an annular passage 148 between the outer surface of the scavenge annulus 146 and the inner surface of the peripheral wall 128.

A swirler can be located within the body 126 to impart a tangential velocity to the cooling fluid stream 116, thereby providing the cooling fluid stream 116 with a swirling motion downstream of the swirler. The swirler of the illustrated embodiment comprises a plurality of swirl vanes 150 fixed to the centerbody 144. The swirl vanes 150 are provided as a circumferential array of airfoils extending radially from the centerbody 144 toward the peripheral wall 128. The number of airfoils may vary; in one example, 6-20 airfoils may be provided. Other swirlers include a screw vane disposed on the inner periphery of the body 126 and/or the outer periphery of the centerbody 144, a tangentially-oriented inlet 132 providing tangential flow injection, or a swirl volute defining the inlet 132.

A deswirler can also be located within the body 126, downstream of the swirler, to remove the tangential velocity from the reduced-particle stream 120 and turn the flow vector of the reduced-particle stream 120 from predominantly swirling to predominantly axial before it exits the inertial separator 114 and recover the total pressure. The deswirler of the illustrated embodiment comprises a plurality of deswirl vanes 152 provided within the scavenge annulus 146. The deswirl vanes 152 are provided as a circumferential array of airfoils extending radially from the centerbody 144 toward the scavenge annulus 146. The number of airfoils may vary; in one example, 6-20 airfoils may be provided. Other deswirlers include a deswirl volute defining the outlet 134.

A development region 154 is defined between the centerbody 144 and the peripheral wall 128, and between the swirl and deswirl vanes 150, 152. In the development region 154, the cooling fluid stream 116 is separated into the particle-laden stream 118 and the reduced-particle stream 120 by the migration of particles radially outwardly due to the centrifugal force applied by the swirling air. As a result, particles accumulate toward the outer radius of the development region 154, creating the particle-laden stream 118 near the outer radius and the reduced-particle stream 120 near the inner radius. Since the particle-laden stream 118 is radially outward of the reduced-particle stream 120, the particle-laden stream 118 passes from the development region 154 to the scavenge outlet 136 via the annular passage 148 at the exterior of the scavenge annulus 146, while the reduced-particle stream 120 passes from the development region 154 to the main flow outlet 134 through the interior of the scavenge annulus 146.

Within the scavenge annulus 146, additional deswirl vanes 156 can be provided in order to remove the tangential velocity from the particle-laden stream 118 and turn the flow vector of the particle-laden stream 118 from predominantly swirling to predominantly axial. The deswirl vanes 156 of the illustrated embodiment are provided as a circumferential array of airfoils extending radially from the scavenge annulus 146 toward the peripheral wall 128. The number of airfoils may vary; in one example, 6-20 airfoils may be provided.

While not shown, the scavenge outlet 136 can further include a volute at the end of the scavenge annulus 146 to turn the particle-laden stream 118 from substantially axial in flow direction to substantially normal to the centerline 138 of the inertial separator 114 so that the particle-laden stream 118 can be extracted from the inertial separator 114.

The filter 122 includes a return outlet 158 that emits the second reduced-particle stream 124. The return outlet 158 is fluidly coupled with a venturi 160 to increase the pressure differential across the assembly 112. The filter 122 can be coupled with the scavenge outlet 136 via a first conduit 162 which can define at least a portion of an inlet to the filter 122, and with the venturi 160 via a second conduit 164 which can define at least a portion of the return outlet 158.

In the present embodiment, the venturi 160 is a constricted section of a conduit extending from the main flow outlet 164 and includes a convergent section 166 downstream of the main flow outlet 164, a throat 168, and a divergent section 170 downstream of the throat 168. The convergent section 166 defines a high pressure inlet for the first reduced-particle stream 120 from the inertial separator 114. The venturi 160 further includes a low pressure inlet 172 at the throat 168 that is fluidly coupled with the return outlet 158. The low pressure inlet 172 can comprise a low pressure connection with the second conduit 164. As it is downstream of the main flow outlet 164 and the low pressure inlet 172, the divergent section 170 defines an outlet that emits a combined fluid stream 174 including both reduced-particle streams 120, 124. As disclosed above with respect to FIG. 2, this combined fluid stream can be provided to the hot portion 78 of the engine 10.

Figure 4:
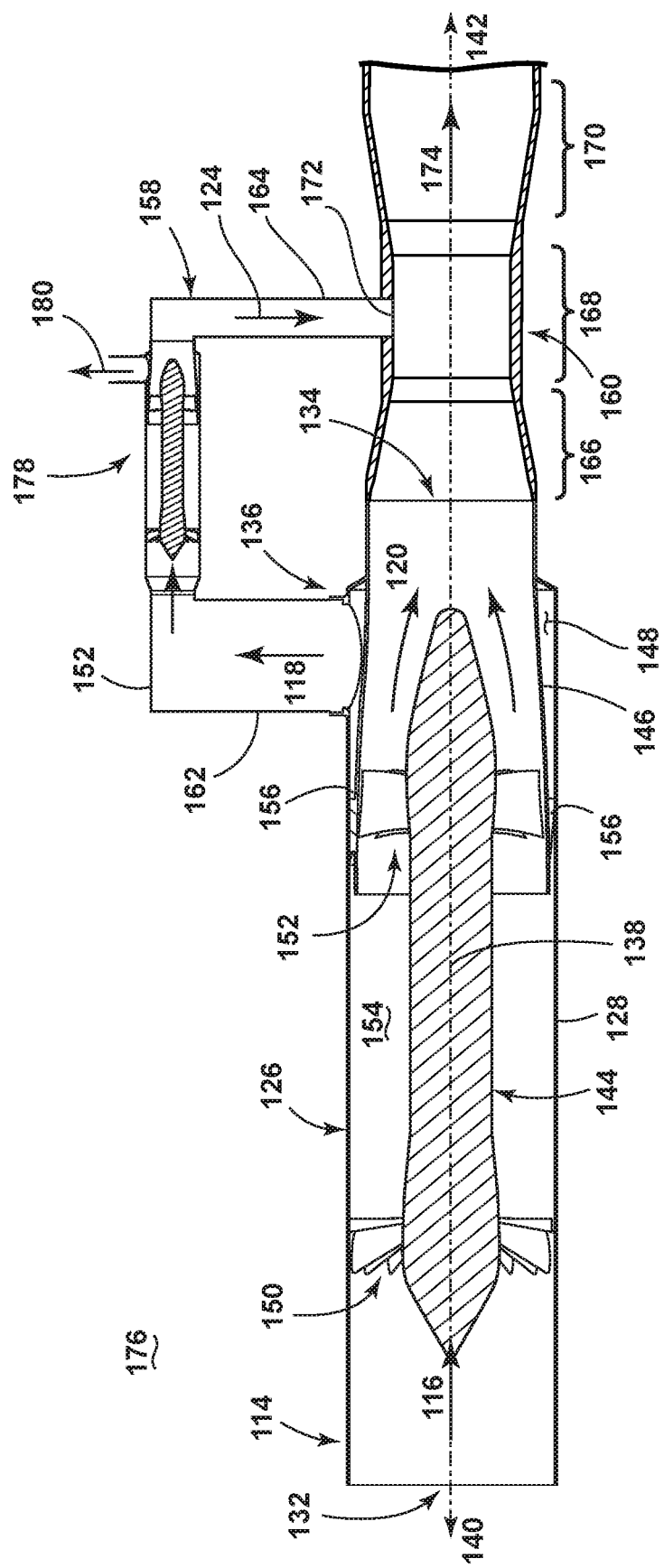
FIG. 4 is a schematic sectional view of a separator assembly according to a third embodiment of the invention.

FIG. 4 is a schematic sectional view of an assembly 176 according to a third embodiment of the invention. The second embodiment of the invention is substantially similar to the second embodiment, and like elements are identified with the same reference numerals. The third embodiment differs from the second embodiment in that the assembly 176 includes a second particle remover in the form of a second particle separator 178 for further separating at least some of the particles from the particle-laden stream 118 and emitting the second reduced-particle stream 124 that is returned to the inertial separator 114. The second particle separator 178 separates particles from the incoming particle-laden stream 118 into the second reduced-particle stream 124 which contains fewer or a lower concentration of particles than the particle-laden stream 118 and a second particle-laden stream 180 which contains at least some of the particles from the particle-laden stream 118. As noted above with respect to FIG. 2, the second particle-laden stream 180 may be exhausted from the engine 10 or may be utilized in other portion of the engine 10. For example, the second particle-laden stream 180 may be used for cooling the HP turbine after passing through an additional particle remover, driving the LP turbine 36, dumped from the engine 10 under the fan casing 40, or supplied to a combustor bleed 102 after passing through an additional particle remover.

The second particle separator 178 can be an inertial separator which separates particles from the cooling air flow using a combination of forces, such as centrifugal, gravitational, and inertial. More specifically, the inertial separator may be a centrifugal or cyclonic separator, which uses cyclonic action to separate particles from the cooling air flow. As shown herein, the second particle separator 178 is substantially identical to the first inertial separator 114, and will not be described in detail herein.

Figure 5:
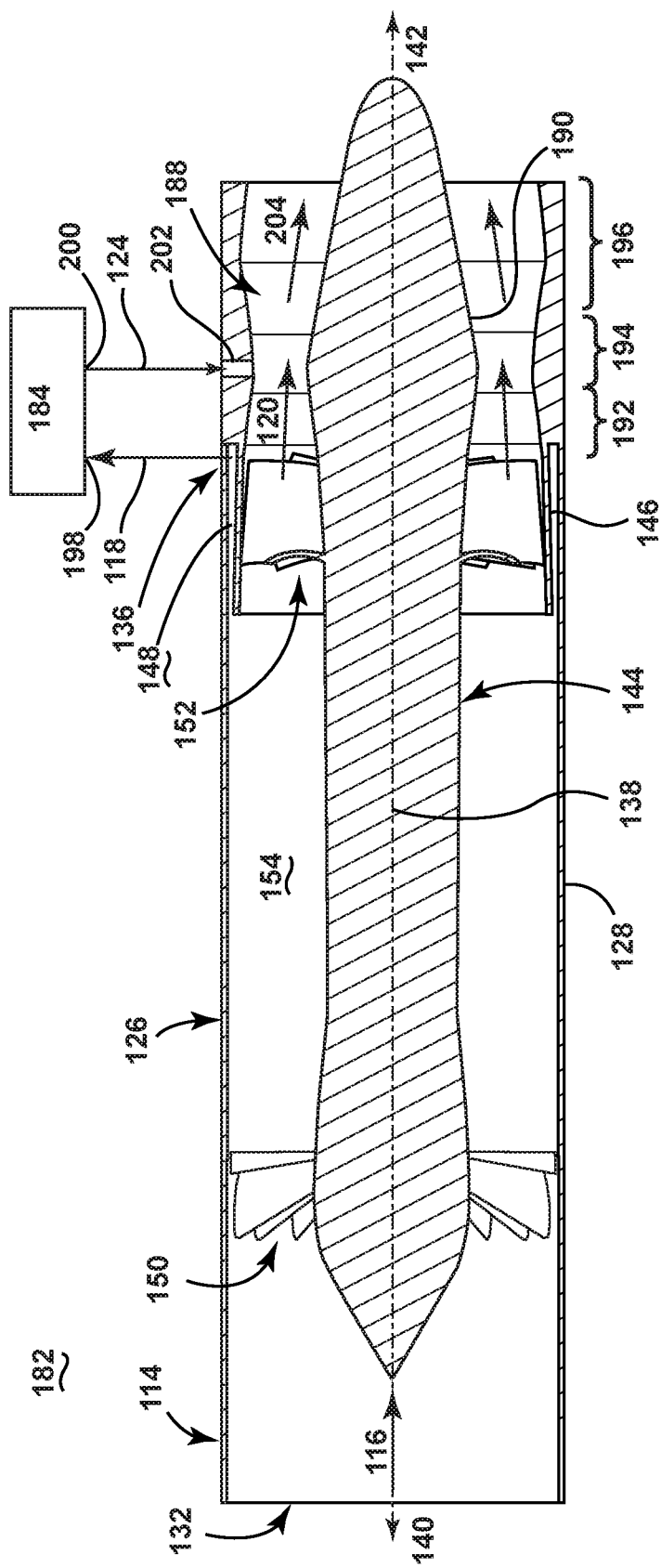
FIG. 5 is a schematic sectional view of a separator assembly according to a fourth embodiment of the invention.

FIG. 5 is a schematic sectional view of an assembly 182 according to a fourth embodiment of the invention. The fourth embodiment of the invention is substantially similar to the second embodiment, and like elements are identified with the same reference numerals. The assembly 182 includes a first particle remover in the form of the inertial separator 114 described in FIG. 3, and a second particle remover 184 for further collecting at least some of the particles from the particle-laden stream 118 and emitting the second reduced-particle stream 124. It is noted that the second particle remover 184 is illustrated schematically in FIG. 5, and may comprise any of the particle removers disclosed herein, including, for example, the filter of the second embodiment or the inertial separator of the third embodiment.

The fourth embodiment differs from the second embodiment in that a venturi 188 is provided within the main flow outlet 134 for increasing the pressure differential across the assembly 182. In the present embodiment, the venturi 188 is a constricted section of the main flow outlet 134 downstream of the deswirl vanes 152, and is defined by a terminal end 190 of the centerbody 144 and the scavenge annulus 146. The venturi 188 includes a convergent section 192 downstream of the deswirl vanes 152, a throat 194, and a divergent section 196 downstream of the throat 194. The scavenge annulus 146 and the terminal end 190 can be correspondingly shaped to provide the convergent section 192, throat 194, and divergent section 196.

The second particle remover 184 includes an inlet 198 coupled with the scavenge outlet 136 and a return outlet 200 that emits the second reduced-particle stream 124. The return outlet 200 is fluidly coupled with the venturi 188. While not shown in FIG. 5, the second particle remover 184 can be coupled with the scavenge outlet 136 and the venturi 188 via one or more conduits, similar to those shown in FIGS. 3 and 4.

The convergent section 192 defines a high pressure inlet for the first reduced-particle stream 120 from the inertial separator 114. The venturi 188 further includes a low pressure inlet 202 at the throat 194 that is fluidly coupled with the second particle remover 184 to combine the second reduced-particle stream 124 with the first reduced-particle stream 120 and form a combined fluid stream 204. The divergent section 196 defines an outlet for the combined fluid stream 204. As disclosed above with respect to FIG. 2, this combined fluid stream 204 can be provided to the hot portion 78 of the engine 10.

Figure 6:
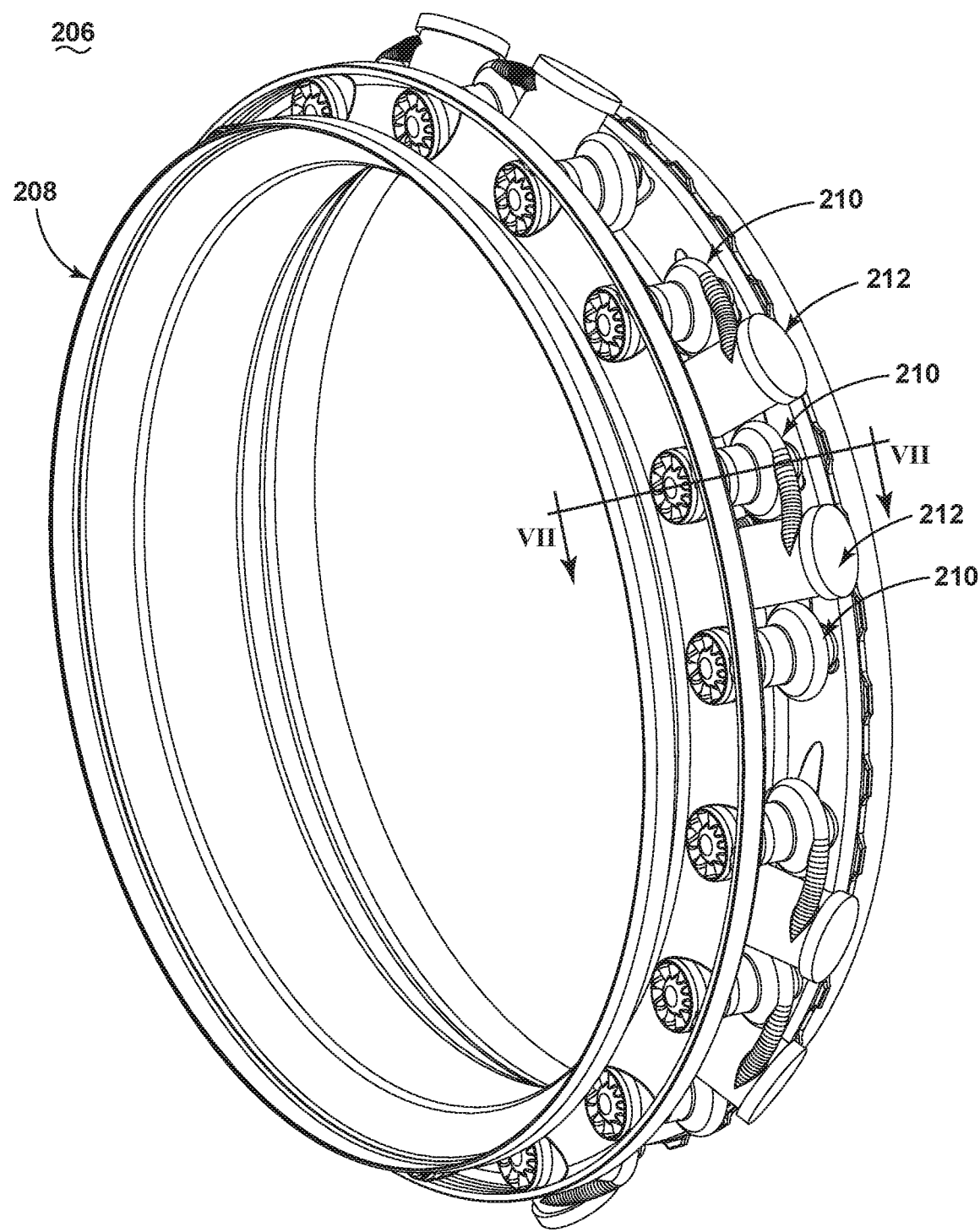
FIG. 6 is a schematic sectional view of a separator assembly according to a fifth embodiment of the invention in the form of an inducer section.

FIG. 6 is a perspective view of an assembly according to a fifth embodiment of the invention. The assembly is illustrated as an inducer section 206 that can be incorporated in the engine 10 of FIG. 1. The inducer section 206 includes a ring-shaped body 208 having a plurality of first particle removers in the form of centrifugal separators 210, at least some of which have an associated second particle remover in the form of a filter 212. The ring-shaped body 208 can be coaxially aligned on the centerline 12 of the engine 10 (see FIG. 1).

Figure 7:
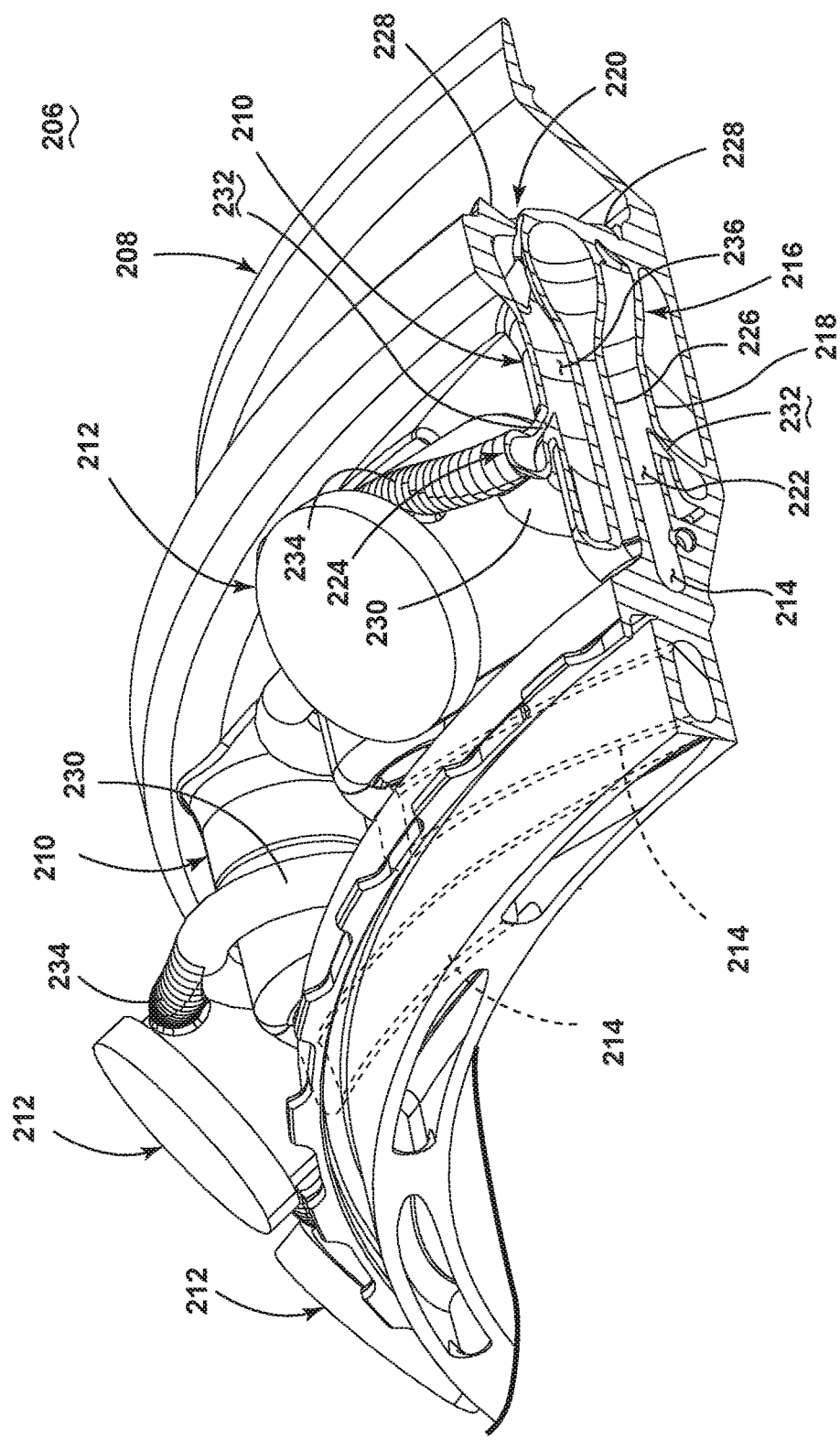
FIG. 7 is a close-up of a portion of the inducer section from FIG. 6, showing one centrifugal separator in cross-section along line VII-VII.

FIG. 7 is a close-up of a portion of the inducer section 206 from FIG. 6, showing one of the centrifugal separators 210 in cross-section. The ring-shaped body 208 further includes a plurality of inducer passages 214 in fluid communication with a combined fluid stream emitted from the centrifugal separators 210 and filters 212. The inducer passages 214 can be configured to accelerates and turn the combined fluid stream, and injects the combined fluid stream into an HP turbine, such as the turbine 34 from FIG. 1.

The centrifugal separator 210 includes a body 216 having a wall 218 defining a flow passage, with a flow inlet 220 which receives the cooling fluid stream, a main flow outlet 222 through which the reduced-particle stream is passed, and a scavenge outlet 224 through which the particle-laden stream is passed. A centerbody 226 can be spaced from the wall 218, and can be designed to provide an aerodynamic profile for the flowing air to pass smoothly around the centerbody 226 without separating from the surface of the centerbody 226.

A swirler can be located within the body 216 to impart a tangential velocity to the cooling fluid stream, thereby providing the cooling fluid stream with a swirling motion downstream of the swirler. The swirler of the illustrated embodiment comprises a plurality of swirl vanes 228 fixed to the centerbody 226.

A annular chamber 230 is spaced radially outwardly from the wall 218 and defines, at least in part, the scavenge outlet 224. An annular scavenge passage 232 can extend from the wall 218 to the annular chamber 230. At least one conduit 234 can extend from periphery of the annular chamber 230 to the filter 212. A single chamber 230 and annular passage 232 is provided in the present embodiment to define the scavenge outlet 224. In another embodiment, the scavenge outlet 224 can be defined by multiple chambers 230 and passages 232.

The main flow outlet 222 of the illustrated embodiment is downstream of the swirl vanes 228 and the annular passage 232 and is in fluid communication with the inducer passage 214.

A development region 236 is defined between the centerbody 226 and the wall 218, and between the swirl vanes 228 and the annular passage 232. In the development region 236, the cooling fluid stream is separated into the particle-laden stream and the reduced-particle stream by the migration of particles radially outwardly due to the centrifugal force applied by the swirling air. As a result, particles accumulate toward the outer radius of the development region 236, creating the particle-laden stream near the outer radius and the reduced-particle stream near the inner radius. Since the particle-laden stream is radially outward of the reduced-particle stream, the particle-laden stream passes from the development region 236 to the scavenge outlet 224 via the annular passage 232, while the reduced-particle stream passes from the development region 236 to the main flow outlet 222 interiorly of the annular passage 232. The annular radius of the development region 236, which may be defined by the centerbody 226 and the wall 218, may decrease in the downstream direction from the flow inlet 220 to improve particle separation.

Figure 8:
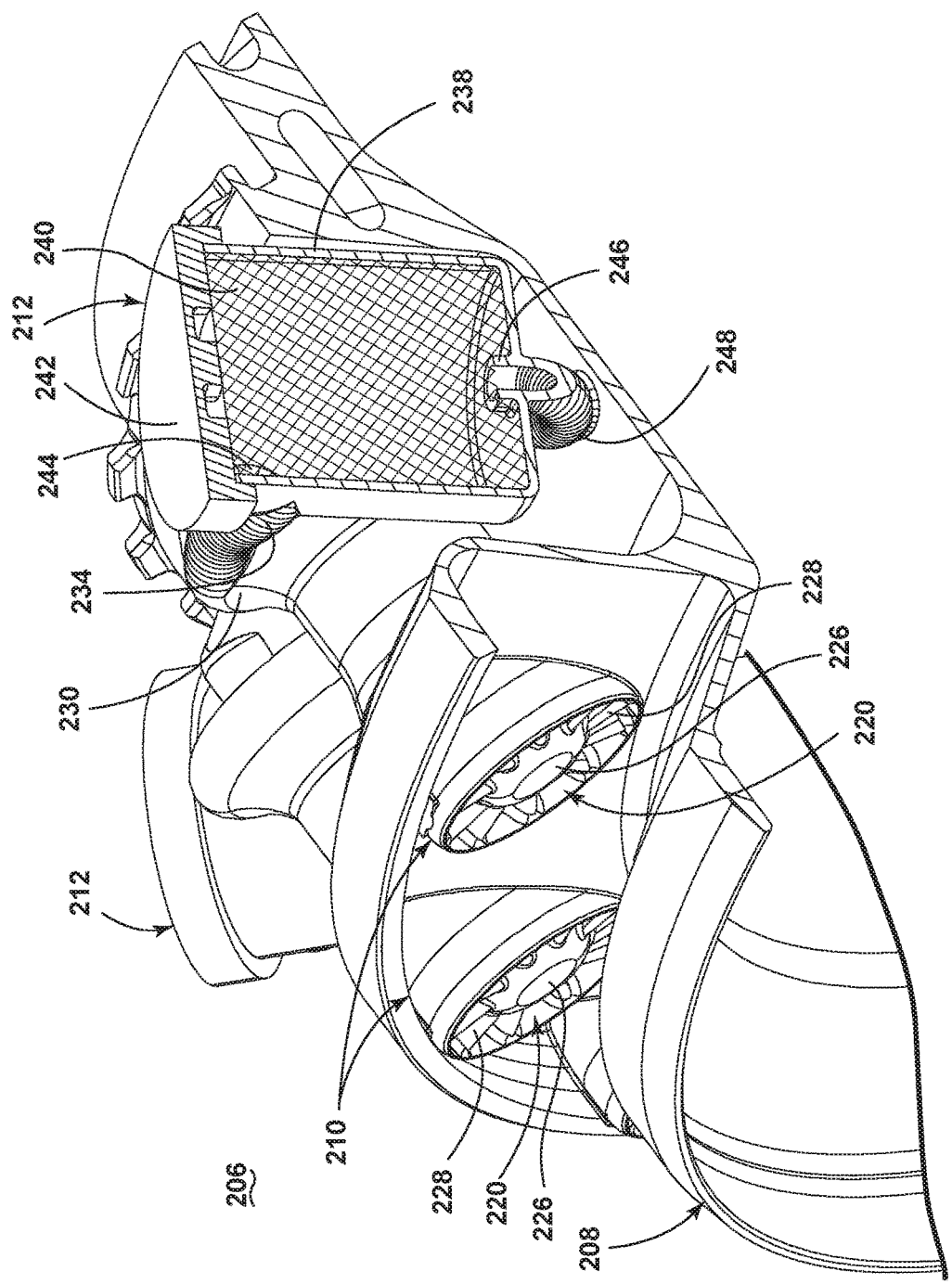
FIG. 8 is a close-up of a portion of the inducer section from FIG. 6, showing one filter in cross-section.

FIG. 8 is a close-up of a portion of the inducer section 206 from FIG. 6, showing one of the filters 212 in cross-section. The filter 212 includes a filter housing 238 containing a filter media 240. The filter housing 238 may be accessible for periodic servicing, such as for cleaning or replacing the filter media 240 during an engine overhaul. In the present example, the filter housing 238 can include a removable cover 242 for accessing the filter media 240. The filter 212 further includes an inlet 244 fluidly coupled with the conduit 234 extending from periphery of the annular chamber 230 and a return outlet 246 that emits the second reduced-particle stream. The conduit 234 coupling the annular chamber 230 to the filter 212 can extend generally tangentially with respect to the filter housing 238 in order to project a generally tangentially introduction of fluid through the inlet 244. The return outlet 246 can be at least partially defined by a return conduit 248 that extends from the filter housing 238.

Figure 9:
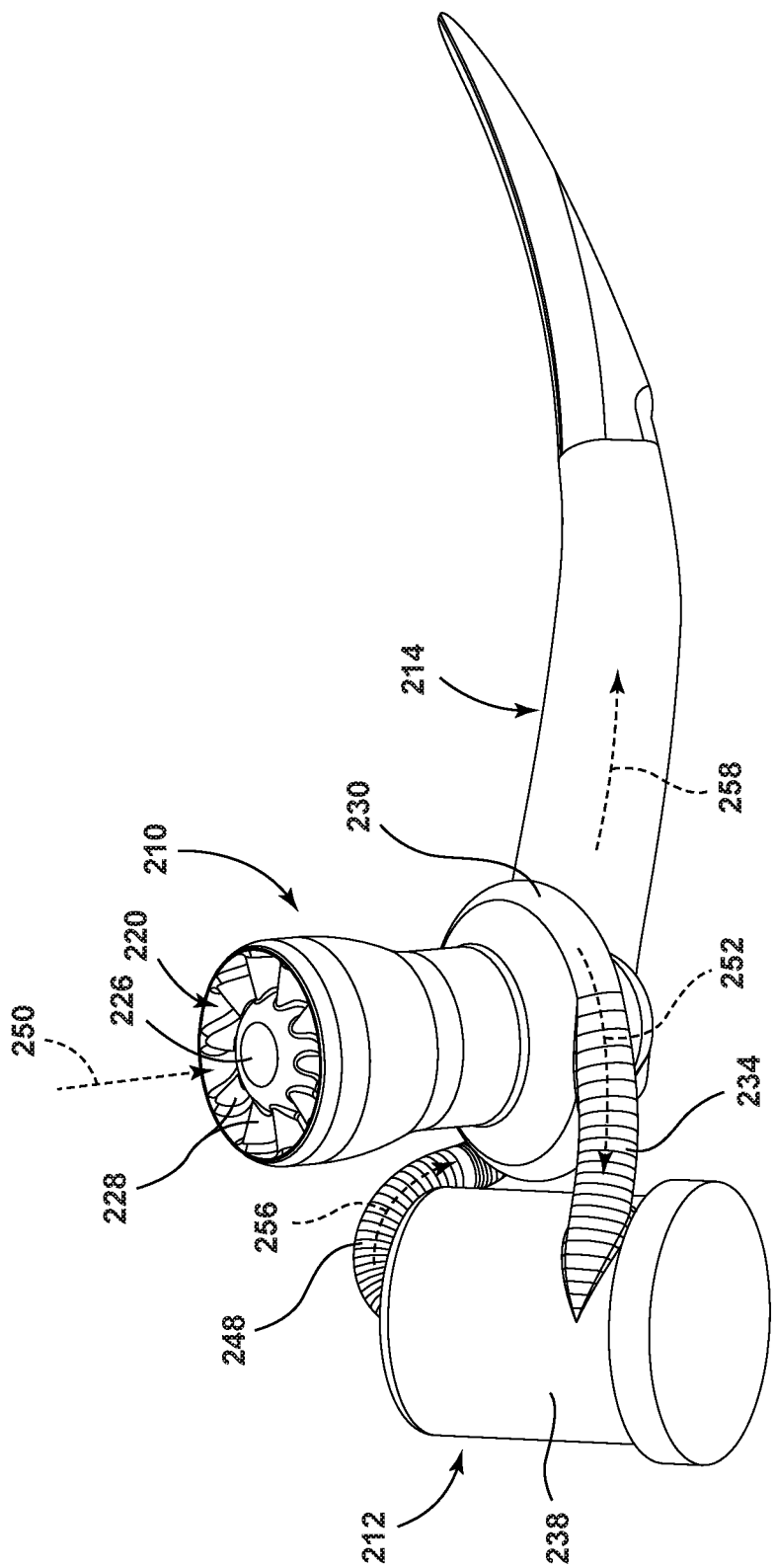
FIG. 9 is a perspective view of one centrifugal separator, filter, and inducer passage of the inducer section from FIG. 6 in isolation, oriented to show the inlet side of the centrifugal separator.
Figure 10:
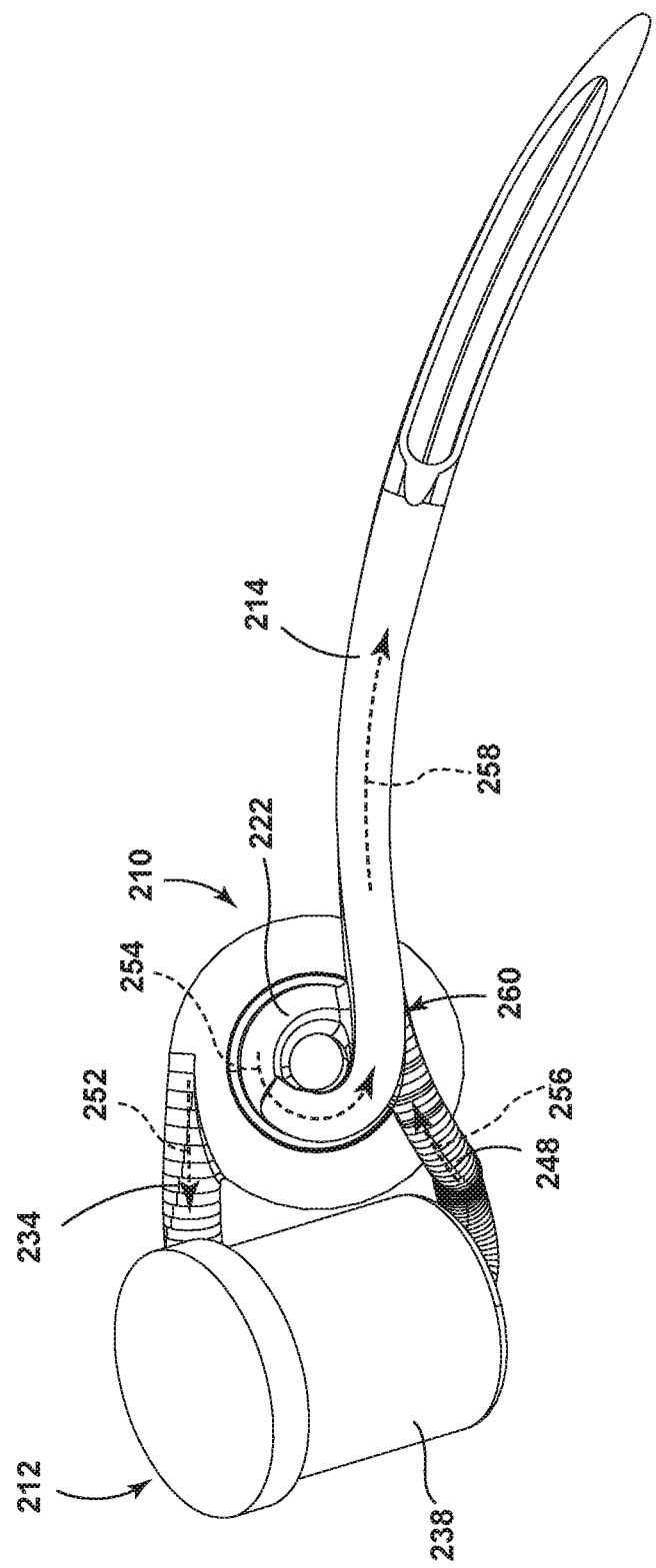
FIG. 10 is a perspective view of one centrifugal separator, filter, and inducer passage of the inducer section from FIG. 6 in isolation, oriented to show the outlet side of the centrifugal separator.

FIGS. 9 and 10 are perspective views of one of the centrifugal separators 210, filters 212, and inducer passages 214 from FIG. 6 in isolation. In operation, the centrifugal separator 210 separates particles from an incoming cooling fluid stream 250 into a particle-laden stream 252 which contains at least some of the particles from the cooling fluid stream, and a first reduced-particle stream 254 which contains fewer or a lower concentration of particles than the particle-laden stream 252. The filter 212 receives the particle-laden stream 252 via the conduit 234, and collects at least some of the particles from the particle-laden stream 252. A second reduced-particle stream 256 is emitted from the filter 212 and returned to the centrifugal separator 210 via the conduit 248 to form a combined stream 258 that passes through the inducer passages 214.

The main flow outlet 222 and return conduit 248 join the inducer passage 214 at a junction 260. At least a portion of the main flow outlet 222 can have a reduced cross-section such that the main flow outlet 222 provides the first reduced-particle stream 254 to the inducer passage 214 at a lower pressure than the pressure of the second reduced-particle stream 256 at the junction 260. This configuration of the junction 260 effectively forms a venturi at the connection between the main flow outlet 222, the return conduit 248, and the inducer passage 214.

The return conduit 248 can be coupled with the inducer passage 214 to introduce the second reduced-particle stream 256 at an advantageous orientation relative to the flow direction of the first reduced-particle stream 254 in order to minimize pressure loss due to the mixing of the two steams. As shown, the return conduit 248 can be coupled with the inducer passage 214 to provide a minimal angle between the two streams 254, 256. The angle may be less than 90 degrees or, more specifically, less than 45 degrees, relative to the flow direction.

In any of the embodiments disclosed herein having a filter as the second particle remover, the filter can have a particle capacity to complete a life-cycle of specified duration. An exemplary filter can have a diameter of 0.1 inch-6 inch and a length of 1 inch-10 inch. The filter can further be capable of operating at a maximum temperature of 1400° F. and at a maximum pressure of 900 psia. The filter can be an accessible unit that can be periodically serviced, such as by cleaning or replacing the filter during an engine overhaul.

Further, in any of the embodiments disclosed herein having a filter as the second particle remover, the filter can include a filter media configured to remove a predetermined particle size from the particle-laden stream that is smaller than the particle size that the first particle remover is capable of removing. In one example, the filter can capture particles greater than 0.01 microns in size, while the first particle separator of the separator assembly can separate particle greater than 1.0 microns in size. Some non-limiting examples of a suitable filter media include porous ceramic, porous metal, metal foam, metal fiber, ceramic fiber, metal honeycomb, or ceramic honeycomb.

Any of the embodiments disclosed herein can further have a particle entrapment device as the second particle remover. The particle entrapment device can be an accessible unit that can be periodically serviced, such as by cleaning or replacing the substrate during an engine overhaul. Some non-limiting examples of a particle entrapment substrate include honeycomb or bristles.

The various embodiments of systems, methods, and other devices related to the invention disclosed herein provide improved particle separation, particularly in a turbine engine. One advantage that may be realized in the practice of some embodiments of the described systems is that the various embodiments of systems, methods, and other devices disclosed herein may be used, alone or in combination, to remove particles from a cooling air flow in a turbine engine. The reduction of particles in the cooling air can improve cooling and engine component durability. The service life of aircraft engines is often limited by particle accumulation in turbine cooling passages, and so removal or significant reduction in particle accumulation will increase the operational lifespan of engines between servicing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An assembly for removing particles from a fluid stream, comprising:
   a first particle remover having a particle separator separating the fluid stream into a first reduced-particle stream and a particle-laden stream, and comprising a main flow outlet emitting the first reduced-particle stream and a scavenge flow outlet emitting the particle-laden stream;
   a second particle remover fluidly coupled to the scavenge flow outlet and comprising a return outlet emitting a second reduced-particle stream; and
   a venturi having a low pressure inlet fluidly coupled to the return outlet,
   wherein the venturi is configured to draw the second reduced-particle stream emitted at the return outlet and input the second reduced-particle stream into the main flow outlet emitting the first reduced-particle stream to mix the second reduced-particle stream with the first reduced-particle stream.

2. The assembly of claim 1 wherein the venturi comprises a constricted section of a conduit downstream of the return outlet.

3. The assembly of claim 1 wherein the second particle remover comprises a filter.

4. The assembly of claim 3 wherein the filter is configured to capture particles greater than 0.01 microns in size.

5. The assembly of claim 3 wherein the filter comprises a filter media of porous ceramic, porous metal, metal foam, metal fiber, ceramic fiber, metal honeycomb, or ceramic honeycomb.

6. The assembly of claim 1 wherein the first particle remover comprises a centrifugal separator.

7. The assembly of claim 6 wherein the second particle remover comprises an inertial separator.

8. The assembly of claim 7 wherein the inertial separator comprises a swirler located within the fluid stream and imparting a tangential velocity to the fluid stream, thereby providing the fluid stream with a swirling motion downstream of the swirler.

9. The assembly of claim 8 wherein the inertial separator comprises a deswirler located downstream of the swirler and removing the tangential velocity from the fluid stream.

10. The assembly of claim 9 wherein the swirler comprises one of a plurality of swirl vanes, and the deswirler comprises one of a plurality of deswirl vanes.

11. An assembly for removing particles from a fluid stream, comprising:
    a first particle remover having a particle separator separating the fluid stream into a first reduced-particle stream and a particle-laden stream, and comprising a main flow outlet emitting the first reduced-particle stream and a scavenge flow outlet emitting the particle-laden stream;
    a second particle remover fluidly coupled to the scavenge flow outlet and comprising a return outlet emitting a second reduced-particle stream; and
    a venturi formed by a junction of the main flow outlet and the return outlet, where the main flow outlet at the junction has a reduced cross section defining a low pressure area, and the return outlet is fluidly coupled to the low pressure area at the junction, whereby the second reduced-particle stream is drawn by the low pressure area into and mixed with the first reduced-particle stream at the junction.

12. The assembly of claim 11 wherein the venturi comprises a constricted section of a conduit downstream of the return outlet.

13. The assembly of claim 11 wherein the first particle remover comprises a centrifugal separator.

14. The assembly of claim 11 wherein the second particle remover comprises one of porous ceramic, porous metal, metal foam, metal fiber, ceramic fiber, metal honeycomb, or ceramic honeycomb.

15. The assembly of claim 11 wherein the second particle remover comprises one of a filter, a centrifugal separator, or an inertial separator.

16. An assembly for removing particles from a fluid stream, comprising:
    a first particle remover having a main flow outlet emitting a first reduced-particle stream and a scavenge flow outlet emitting a particle-laden stream;
    a second particle remover fluidly coupled to the scavenge flow outlet and comprising a return outlet emitting a second reduced-particle stream; and
    a venturi fluidly coupling the first particle remover and the second particle remover,
    wherein the venturi is configured to draw the second reduced-particle stream emitted at the return outlet and input the second reduced-particle stream into the main flow outlet emitting the first reduced-particle stream to mix the second reduced-particle stream with the first reduced-particle stream.

17. The assembly of claim 16 wherein the venturi comprises a convergent section, a divergent section, a throat between the convergent section and the divergent section, with a high-pressure inlet located at the convergent section and a low-pressure inlet located at the throat.

18. The assembly of claim 17 wherein the first particle remover is fluidly coupled to the high-pressure inlet and the second particle remover is fluidly coupled to the low-pressure inlet.

19. The assembly of claim 16 wherein the venturi comprises a first inlet fluidly coupled to the first particle remover and a second inlet fluidly coupled to the second particle remover.

20. The assembly of claim 19 wherein the venturi further comprises an outlet emitting a combined fluid stream defined by a mixture of the particle-laden stream from the scavenge flow outlet and the second reduced-particle stream from the return outlet.

* * * * *